(12) United States Patent
Katoh et al.

(10) Patent No.: US 7,264,873 B2
(45) Date of Patent: Sep. 4, 2007

(54) SURFACE PROTECTING FILM FOR POLYCARBONATE

(75) Inventors: Kazuya Katoh, Tokyo (JP); Mamoru Kobayashi, Tokyo (JP); Shin Kubota, Tokyo (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 11/312,688

(22) Filed: Dec. 21, 2005

(65) Prior Publication Data

US 2006/0105132 A1 May 18, 2006

Related U.S. Application Data

(62) Division of application No. 10/643,933, filed on Aug. 20, 2003, now abandoned.

(30) Foreign Application Priority Data

Aug. 22, 2002 (JP) .............................. 2002-241699

(51) Int. Cl.
- *C08F 2/46* (2006.01)
- *B32B 27/06* (2006.01)
- *B32B 27/04* (2006.01)
- *B32B 7/12* (2006.01)

(52) U.S. Cl. .............................. 428/355 AC; 428/343; 428/349; 428/352; 428/355 R; 428/355 N; 522/90; 522/96; 522/104; 522/107; 522/106; 522/109; 522/110; 522/113; 522/120; 522/121; 522/126

(58) Field of Classification Search ................... 522/90, 522/96, 104, 107, 106, 109, 110, 113, 120, 522/121, 126; 428/343, 345, 349, 352, 355 R, 428/355 AC, 355 N See application file for complete search history.

(56) References Cited

U.S. PATENT DOCUMENTS 5,389,437 A    2/1995   Miyajima et al.
6,472,065 B1  10/2002   Alahapperuma et al.

FOREIGN PATENT DOCUMENTS

| JP | 01-242679 | 9/1989 |
| JP | 2001-243659 | 9/2001 |
| JP | 2002-303005 | 10/2001 |

*Primary Examiner*—Sanza L. McClenodn
(74) *Attorney, Agent, or Firm*—Lowe, Hauptman & Berner, LLP (57) ABSTRACT

The objective is to provide a surface protecting film for polycarbonate which is easy to laminate on polycarbonate and remove from the polycarbonate, the peel adhesive strength change to polycarbonate with times is small and there is no adhesive transferring to the backside of the film substrate in the case of storage for a long period or at a high temperature in the roll shape made of the long length tape.

There provided a surface protecting film for polycarbonate, wherein a film substrate having Young's modulus of 1 GPa or more and an adhesive layer are comprised, the glass transition temperature (Tg) of the adhesive composing of the pressure sensitive adhesive layer being between 40 to 90° C. and the initial 180° peel adhesive strength to polycarbonate being between 10 to 300 mN/25 mm.

7 Claims, 9 Drawing Sheets

Scanning position (relative value)

(b)

Scanning position (relative value)

SURFACE PROTECTING FILM FOR POLYCARBONATE

TECHNICAL FIELD

The present invention relates to a surface protecting film for polycarbonate (hereinafter sometimes called as just surface protecting film), and more particularly to a surface protecting film, wherein the peel adhesive strength change to polycarbonate with times is small and there occurs no wrinkles and like due to the winding compaction pressure even if it is stored for a long period or at a high temperature in the roll shape made of a long length tape.

BACKGROUND ART

Figure 4:
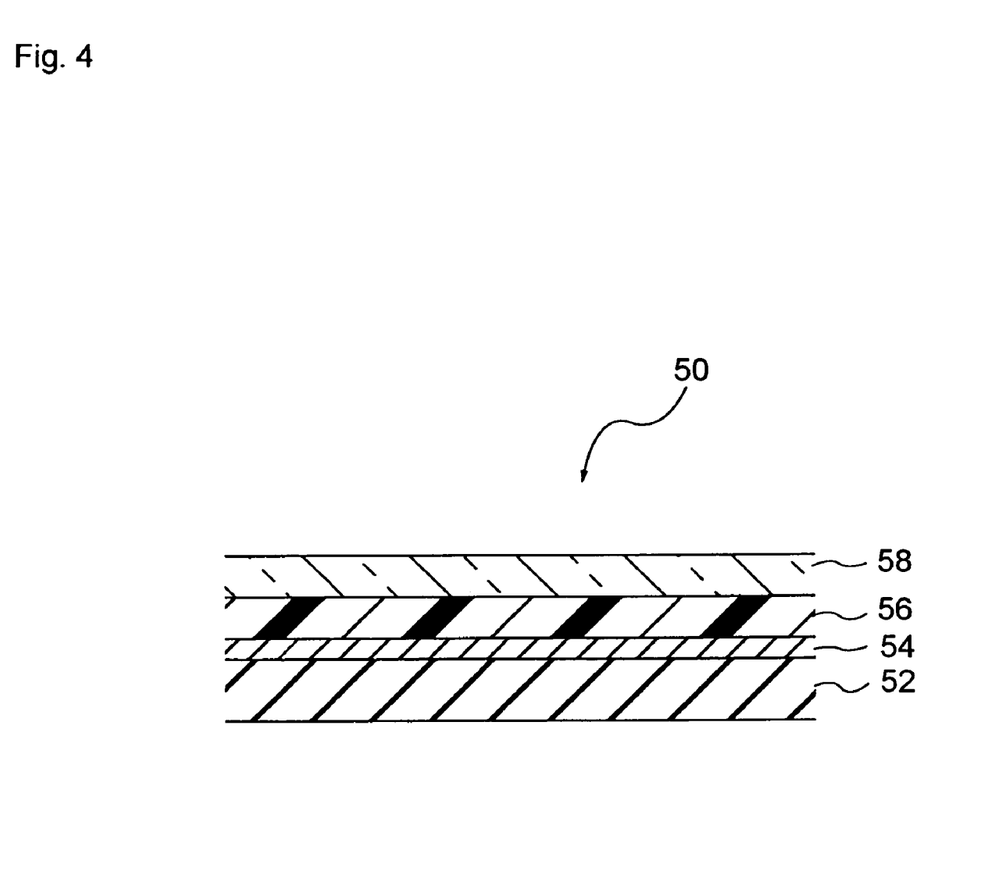
FIG. 4 is a view for explaining the next generation optical disc.

Recently, since their optical property and mechanical property are excellent, a film or plate made of a polycarbonate resin (hereinafter sometimes called as just polycarbonate) have been widely used in the variety of the usages. Such polycarbonate is often applied with the surface treatment, not solely used. For example, as for the DVD (Digital Versatile Disc), a recording layer is formed on one surface of two sheets of polycarbonate, and then they are laminated by using an UV curable adhesive. Further, the next generation optical disc (Blu-ray Disc (trade name)), which uses a blue short wavelength laser as the recording/replaying medium, has been invented. As shown in FIG. 4, since an objective lens having a high resolution and short focus length is used for such next generation optical disc 50, a laminated construction of a polycarbonate sheet (thickness: 1.1 mm) 52 having a recording layer 54 with a light transmission protective film 58 consisting of a thin polycarbonate film (thickness: 0.1 mm) by using an adhesive layer 56 is proposed.

Therefore, when the specific treatments are applied to such polycarbonate film or plate, a protective film is laminated onto the surface of polycarbonate or the other protective film is co-winded with polycarbonate in order to prevent scratch and to provide the smoothing ability in each step.

For example, JP2001-303005A has disclosed the polyethylene film having the specific pressure sensitive adhesive layer in order to provide a surface protecting film for a polycarbonate resin plate having the small adhesive strength change even heated at high temperature as well as a polycarbonate resin plate in the heating process and the sufficient initial adhesive strength at the normal temperature.

More concretely, a surface protecting film for a polycarbonate resin plate was disclosed in that a pressure sensitive adhesive which comprised the specific ethylene-α-olefin copolymer made from a polymerization method using a single sight catalyst to obtain the proper initial adhesive strength, and the specific low density polyethylene resin made from a polymerization method using a Ziegler catalyst to obtain the proper stable adhesive strength with times in a fixed additional ratio respectively, was laminated onto the polyethylene film by a co-extruding method.

Here, for the disclosed surface protecting film for a polycarbonate resin plate, it is preferable that the initial peel adhesive strength should be a value within about 100 to 500 mN/25 mm due to preventing the self peeling from the surface protecting film as well as being easy to peel off such surface protecting film when it is taken away from a polycarbonate resin plate.

Further, JP1-242679 A has disclosed the making method for a surface protected article in that a surface protecting film comprising thin plastic or metal substrates and an UV (ultraviolet) curable adhesive was laminated in the manner that it was easy to peel off from an objective substrate.

More concretely, the making method for the surface protected article was disclosed in that the UV curing process for an UV curable adhesive provided on a surface protecting film was carried out in considering of the material and surface roughness of the objective substrate and the like, due to adjusting the adhesive strength of the UV curable adhesive and then such surface protecting film was laminated onto the objective substrate via the UV cured adhesive.

Further, JP2001-243659 A has disclosed a plastic film winding obtained from laminating a surface protecting film which is for an optical disc as a transparent protecting film with a polyethylene terephthalate film without an adhesive and winding up them.

More concretely, the polycarbonate film which was for laminating an optical disc substrate made from a polycarbonate resin and had the specific thickness, surface roughness and the like, and a polyethylene terephthalate film were laminated without an adhesive, and then the plastic film winding were made from the above laminate by using a winding machine and the like.

However, it was necessary to apply the considerable strong tension when the surface protecting film for a polycarbonate resin plate was laminated, since the mechanical property of such surface protecting film having the substrate consisting of a polyethylene film disclosed in JP2001-303005A was insufficient and the wrinkle were easily formed.

Therefore, when the polycarbonate film laminated with such surface protecting film was stored for a long period, there was a drawback that strong curling of the polycarbonate film occurred, due to the strong residual stress of the surface protecting film and therefore processing of the polycarbonate film deteriorated. Also, when the polycarbonate film laminated with such surface protecting film in the winded roll was stored for a long period, there were drawbacks that the winding compaction and the wrinkle deformation occurred and the polycarbonate film laminated with such surface protecting film could not be practically used.

Also, the making method for the surface protected article in that the UV cured pressure sensitive adhesive was used in considering of the surface property of the objective substrate, which was disclosed in JP1-242679A, mainly considered the surface protecting film for a metal plate and did not regulate the grass transition temperature and the peel adhesive strength of UV cured pressure sensitive adhesive which was not practical use for the surface protecting film for the polycarbonate film.

In addition, the property of the film substrate was not considered, only polyethylene film was described and the aforementioned curling and the winding compaction were not sufficiently prevented by using the polyethylene film.

Figure 9:
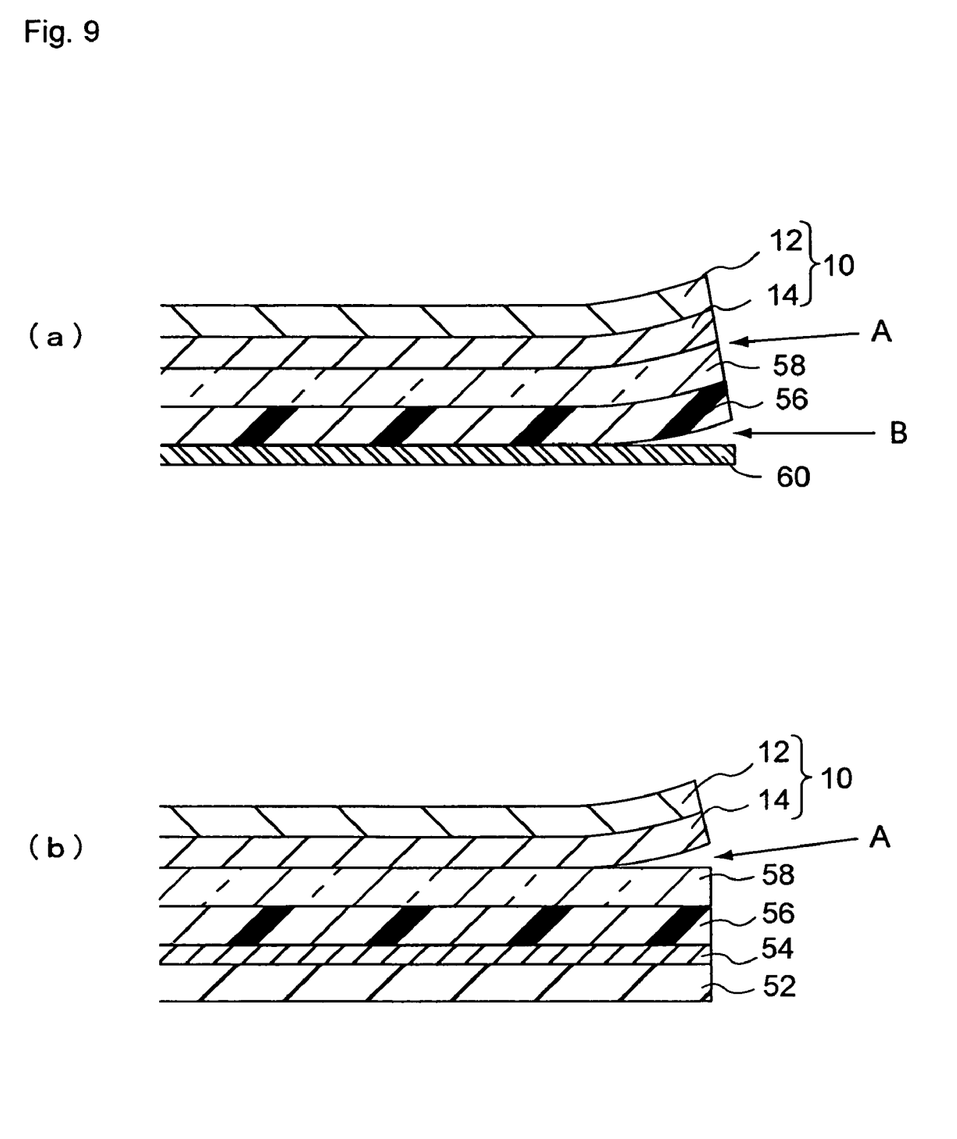

On the other hand, the surface protecting film disclosed in JP1-242679A generally showed the higher peel adhesive strength to polycarbonate than that of the releasing film to polycarbonate film having the pressure sensitive layer. Thus, as shown in FIG. 9(a), the peel adhesive strength of the interface "A" between the surface protecting film 10 consisting of the film substrate 12 and adhesive layer 14, and the polycarbonate film 58 is generally higher than that of the interface "B" between the polycarbonate film 58 having the adhesive layer 56 and the releasing film 60.

Accordingly, when the surface protecting film 10 was released from the polycarbonate film 58, namely the surface protecting film 10 was released at the interface "A", the polycarbonate film 58 having the pressure sensitive adhesive layer was released from the releasing film 60 at the interface "B". So, as shown in FIG. 9(b), the surface protecting film 10 may be released from the polycarbonate film 58 having the pressure sensitive adhesive layer only after laminating such polycarbonate film 58 with the other substrate such as the polycarbonate substrate 52 having a recording layer 54. Accordingly, the conventional surface protecting film has drawbacks that the timing of releasing the polycarbonate film is greatly limited.

Further, the plastic film winding disclosed in JP2001-243659A, when the polycarbonate film was applied for coating applications and the like in the case of re-winding from the roll, the polycarbonate film and the co-winded polyethylene terephthalate film might be separated, and the polycarbonate film might be scratched after the application steps.

Still further, the disclosed plastic film windings has to take away the polyethylene terephthalate film in the application step of the polycarbonate film, the other film has to be winded again with the polycarbonate film or the other surface protecting film has to be laminated with it due to preventing the scratch and the like.

That is, the present invention has the following objects;
1) To provide a surface protecting film, wherein it is easy to laminate with polycarbonate, to prevent the self peeling, and to peel off from polycarbonate optionally.
2) To provide a surface protecting film, wherein the increasing peel adhesive strength (sometimes called as 180° peel adhesive strength) change to polycarbonate with times is suppressed even after storing for a long time or at a high temperature in the roll shape in the condition that the surface protecting film is laminated with polycarbonate as well as preventing the winding compaction.
3) To provide a surface protecting film, wherein it is easy to peel off the surface protecting film from polycarbonate before applying the polycarbonate laminated with the surface protecting film to the other substrate via an adhesive layer.
4) To provide a surface protecting film, wherein there is no adhesive transfer to polycarbonate, when it is laminated with polycarbonate.

SUMMARY OF THE INVENTION

[1] According to the present invention, there is provided a surface protecting film for polycarbonate, wherein a film substrate having the Young's modulus of 1 GPa or more and a pressure sensitive adhesive layer are comprised, the glass transition temperature (Tg) of the pressure sensitive adhesive composing of the adhesive layer being between 40 to 90° C. and the initial 180° peel adhesive strength ($F_{(C0)}$) to polycarbonate being between 10 to 300 mN/25 mm, whereby the above-mentioned drawbacks can be solved.

Thus, by regulating the glass transition temperature (Tg) of the pressure sensitive adhesive in this range, when the polycarbonate film laminated with the surface protecting film is stored for a long period or at a high temperature in the roll shape, the 180° peel adhesive strength change of the surface protecting film to polycarbonate is maintained in a low level, and when the surface protecting film is laminated with polycarbonate, the adhesive transfer to polycarbonate is prevented.

Also, by regulating the initial 180° peel adhesive strength ($F_{(C0)}$) of the surface protecting film to polycarbonate in this range, the spontaneous peeling from polycarbonate may be prevented and such surface protecting film can be easily released from polycarbonate at the time when it is wanted.

Also, by regulating the initial 180° peel adhesive strength ($F_{(C0)}$) of the surface protecting film to polycarbonate in this range, it is easy to lower the peel adhesive strength of the surface protecting film to polycarbonate than that of the polycarbonate which is applied for the pressure sensitive adhesive treatment to releasing film and it is easy to take off the surface protecting film from the polycarbonate before applying to the other substrates.

Moreover, by regulating Young's modulus of the film substrate in this range, the mechanical property of the film substrate can be improved, and when the surface protecting film is laminated with polycarbonate, the needed tension of the surface protecting film can be reduced. Therefore, when the polycarbonate film laminated with the surface protecting film is stored for a long period or at a high temperature in the roll shape, the formation of the wrinkle and the like due to the winding compaction can be efficiently prevented.

Here, the initial 180° peel adhesive strength ($F_{(C0)}$) can be measured for the sample allowing to stand for 7 days at 25° C. after laminating the surface protecting film with polycarbonate.

[2] Further, in constituting the surface protecting film for polycarbonate according to the present invention, it is preferable that, assuming the initial 180° peel adhesive strength to polycarbonate as $F_{(C0)}$, and the 180° peel adhesive strength to polycarbonate after aging under the heating and pressing (at 70° C. and 20 g/cm² for 7 days) as $F_{(hp)}$, these $F_{(hp)}$ and $F_{(C0)}$ satisfy the following relational equation (1).

$$(F_{(hp)} - F_{(C0)})/F_{(C0)} \leq 3.0 \qquad (1)$$

By constituting the surface protecting film like this, it becomes easy to prevent the increasing peel adhesive strength change to polycarbonate with times in the condition the surface protecting film is laminated onto the polycarbonate while storing for long time or at a high temperature in the roll shape.

[3] Further, in constituting the surface protecting film for polycarbonate according to the present invention, it is preferable that the shear storage modulus of the pressure sensitive adhesive at any temperature of 20 to 40° C. is set to a value within a range of $5 \times 10^8$ to $5 \times 10^{10}$ dyn/cm².

By constituting the surface protecting film like this, it becomes easy to laminate the surface protecting film with polycarbonate and when the polycarbonate film laminated with the surface protecting film is stored for a long period or at a high temperature in the roll shape, the winding compaction may be effectively prevented.

[4] Further, in constituting the surface protecting film for polycarbonate according to the present invention, it is preferable that the pressure sensitive adhesive is made of the three-dimensional cross-linked material comprising the following components (A) and (B).
(A): (meth)acrylate copolymer
(B): at least one curable agent selected from an energy ray curable agent and a thermosetting agent (hereinafter sometimes just called as curable agent)

By constituting the surface protecting film like this, it becomes easy to make the pressure sensitive adhesive rapidly by using the energy ray curing process or the heating curing process and to regulate the peel adhesive strength of the pressure sensitive adhesive, the grass transition temperature and the store shear modulus of the pressure sensitive adhesive in a specific range respectively.

Here, it is also favorable that the component (A) should be an energy ray curable type or thermosetting type by introducing a (meth)acryloyl group and the like into the component (A) as well as the component (B). In such case, the component (B) is the other energy ray curable compound or thermosetting compound which is different from the component (A).

[5] Further, in constituting the surface protecting film for polycarbonate according to the present invention, it is preferable that the component (B) is photo curable polyurethane acrylate.

By constituting the surface protecting film like this, the solubility with the (meth)acrylate copolymer of component (A) becomes better and it becomes easy to regulate the 180° peel adhesive strength, the grass transition temperature and the store shear modulus of the obtained pressure sensitive adhesive in a specific range respectively.

[6] Further, in constituting the surface protecting film for polycarbonate according to the present invention, it is preferable that the pressure sensitive adhesive is made of the three-dimensional cross-linked material of (meth)acrylate copolymer obtained by using a 15 wt. % or more of monomer having a functional group.

By constituting the surface protecting film like this, it becomes easy to regulate the 180° peel adhesive strength, the grass transition temperature and the store shear modulus of the pressure sensitive adhesive in a specific range respectively.

[7] Further, in constituting the surface protecting film for polycarbonate according to the present invention, it is preferable that an adhesion improvement layer is provided between the film substrate and the adhesive layer.

By constituting the surface protecting film like this, it becomes easy to regulate the peel adhesive strength having the desirable comparative low 180° peel adhesive strength to the polycarbonate and the comparative proper 180° peel adhesive strength to the film substrate.

[8] Further, in constituting the surface protecting film for polycarbonate according to the present invention, it is preferable that $F_{(RL)}$ and $F_{(CO)}$ satisfy the following relational equation (2) in assuming that the surface protecting film is laminated with polycarbonate of the polycarbonate laminate comprising an adhesive layer provided on a releasing film and polycarbonate on the adhesive layer and the 180° peel adhesive strength between the releasing film and the polycarbonate laminate as $F_{(RL)}$.

$$F_{(RL)} > F_{(CO)} \quad (2)$$

By constituting the surface protecting film in adjusting the 180° peel adhesive strength between each film like this, the releasing timing of the surface protecting film from the polycarbonate laminate becomes to be selective, in other words, the surface protecting film can be released from the polycarbonate both of before and after laminating of the polycarbonate laminate with the substrate.

BRIEF DESCRIPTION OF THE DRAWINGS

FIGS. 7(a) and (b) is a view for explaining the measurement signal directed to height information obtained from a laser microscope.

FIGS. 9(a) and (b) is a view for explaining the peeling condition of the conventional surface protecting film for polycarbonate.

DESCRIPTION OF THE PREFERRED EMBODIMENTS

Preferred embodiments related to a surface protecting film according to the present invention are specifically explained hereinafter in conjunction with drawings suitably.

First Embodiment

Figure 1:
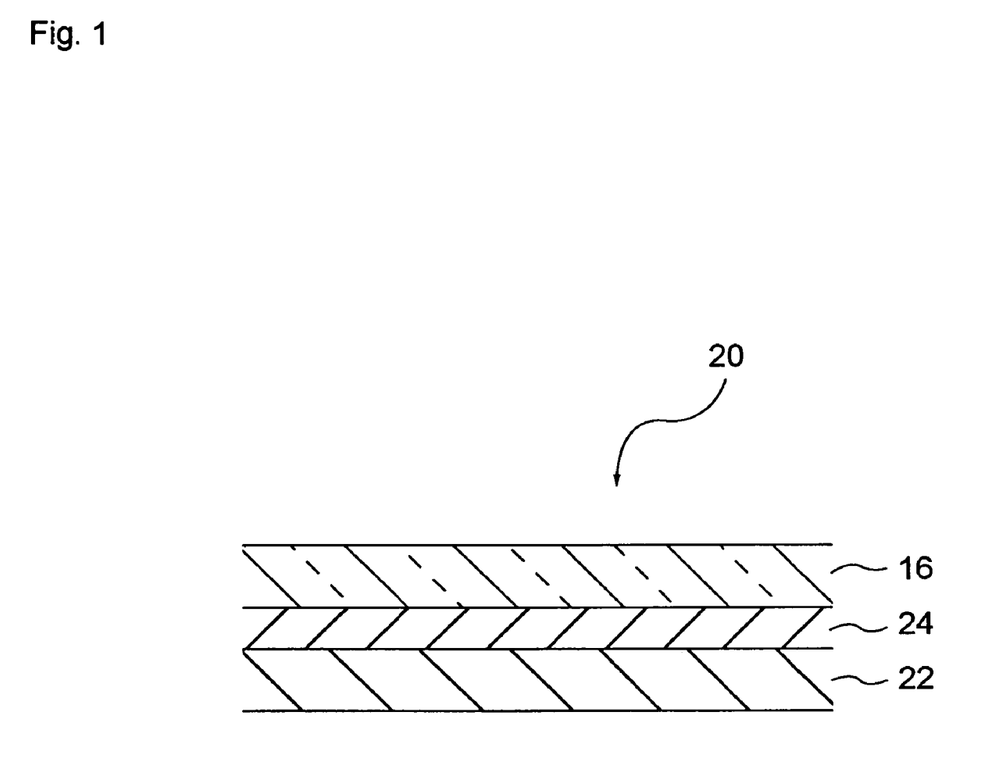
FIG. 1 is a cross-sectional view of the present surface protecting film for polycarbonate.

The first embodiment is directed, as illustrated in FIG. 1, to a surface protecting film for polycarbonate 20, wherein a film substrate 22 having the Young's modulus of 1 GPa or more and an adhesive layer 24 are comprised, the glass transition temperature (Tg) of the pressure sensitive adhesive composing of the adhesive layer 24 being between 40 to 90° C. and the initial 180° peel adhesive strength ($F_{(CO)}$) to polycarbonate being between 10 to 300 mN/25 mm.

Here, it is preferable to laminate a releasing film 16 onto the adhesive layer 24 before applying the surface protecting film 20.

Hereinafter, the respective constitutional features of the surface protecting film for polycarbonate such as the film substrate and the adhesive layer are specifically explained.

1. Film Substrate (1) Young's Modulus

It is characterized that Young's modulus of the film substrate should be 1 GPa or more. The reason is that when Young's modulus of the film substrate is a value of 1 GPa or more, it is easy to decrease the tension value of the surface protecting film when such surface protecting film is laminated with the polycarbonate, and the difference of the tension value between the surface protecting film and the polycarbonate. In other words, when Young's modulus of the film substrate is below 1 GPa, there arises a case that it is necessary to increase the laminating tension due to preventing the wrinkle and the like on the film substrate, as a result, the residual stress of film substrate becomes bigger and the winding compaction may occur.

Accordingly, when the polycarbonate laminated with the surface protecting film which comprises the film substrate having the specific Young's modulus is stored for a long period or at a high temperature in the roll shape, the winding compaction is effectively prevented.

However, if Young's modulus of the film substrate is too high, it may be difficult to wind the laminate of the surface protecting film and the polycarbonate to produce the roll shape, or the surface protecting film may spontaneously peel off from the polycarbonate after laminating.

Accordingly, it is more preferable to set Young's modulus of the film substrate to be a value within a range of about 1 to 15 GPa, and more preferably within a range of about 2 to 10 GPa.

Here, Young's modulus of the film substrate can be measured in accordance with JIS K 7127.

(2) Type

As for the type of a film substrate, it is not limited, but it is preferable to use the film substrate made from polyethylene terephthalate, polyethylene naphtalate, polycarbonate, triacetyl cellulose (TAC), polysulfone, poly(ether ether keton) (PEEK), polyamide, polymethylmethacrylate, polyimide, polyphenylene sulphide, polyarylate, polyacrylonitrile, polyvinylchloride, polylactic acid and the like.

Figure 2:
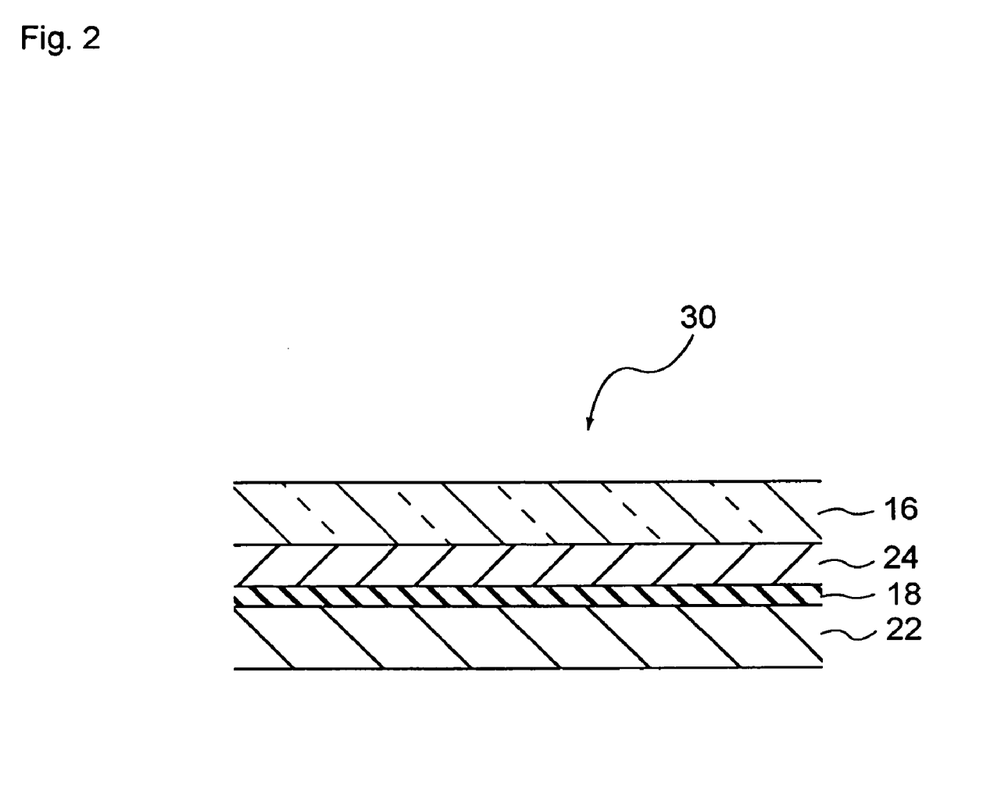
FIG. 2 is a cross-sectional view of the other present surface protecting film for polycarbonate.

Further, as for the type of a film substrate type, it is preferable to provide an adhesive improvement layer 18 on the surface of the film substrate 22 having the good adhesive property as shown in FIG. 2. The reason is that the surface protecting film 30 having the adhesive improvement layer can show the good peel adhesive strength to the film substrate 22 even when the adhesive layer 24 shows the desirable comparative low adhesive strength to polycarbonate.

Here, such adhesive improvement layer 18 is typically a primer layer or the improved layer of the film substrate made by corona treatment and flame treatment.

(3) Thickness

Further, it is preferable that a thickness of the film substrate is set to a value within a range of about 10 to 100 μm.

The reason is that when the thickness of the film substrate is below 10 μm, there may be a case that the mechanical strength of the film substrate decreases and the handling ability becomes worse. On the other hand, when the thickness of the film substrate exceeds 100 μm, it may be difficult to wind the film substrate as well as a polycarbonate film to produce the roll shape or the surface protecting film spontaneously separates from the polycarbonate film after laminating.

Accordingly, it is more preferable to set the thickness of the film substrate to a value within a range of about 15 to 50 μm, and further more preferably within a range of about 20 to 40 μm.

(4) Transparency

Further, it is preferable that the film substrate is transparent or semitransparent. The reason is that, when the pressure sensitive adhesive is a photo curable composition (an energy ray curable composition), the energy ray may effectively cure such composition through the transparent film substrate or semitransparent film substrate.

Accordingly, it is more preferable to set the transmission rate of UV area light via film substrate to a value within a range of about 70% or more, further more preferably within a range of about 80% or more, and most preferably within a range of about 90% or more.

2 Adhesive Layers (1) Glass Transition Temperature (Tg)

Further, it is characteristic to set a glass transition temperature (peak temperature of tan δ value (tangent loss factor) measured by a viscoelasticmeter) of the pressure sensitive adhesive constituting the adhesive layer to a value within a range of about 40 to 90° C.

The reason is that when the glass transition temperature of the pressure sensitive adhesive is below 40° C., there may be a case that, when the polycarbonate with the surface protecting film is stored for a long period or in high temperature condition in the roll shape, there occurs the excessive 180° peel adhesive strength change of the surface protecting film to polycarbonate and it becomes difficult to peel off the surface protecting film from polycarbonate.

On the other hand, when the glass transition temperature of the pressure sensitive adhesive is over 90° C., it may be difficult to laminate the surface protective film with polycarbonate or the surface protecting film spontaneously separates from the polycarbonate film after laminating.

Accordingly, it is more preferable to set the glass transition temperature of the pressure sensitive adhesive to a value within a range of about 45 to 80° C.

Figure 6:
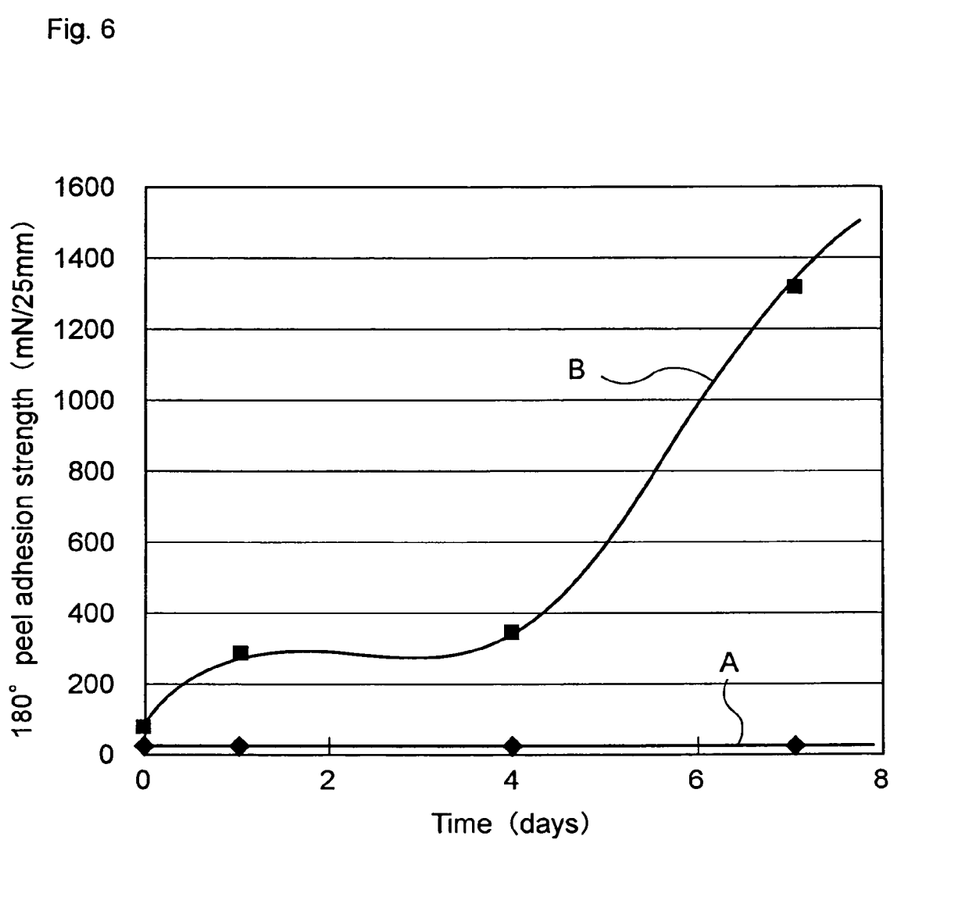
FIG. 6 is a view for explaining the change of 180° peel adhesive strength with times.

Here, the line A in FIG. 6 is directed to the example having the glass transition temperature of the pressure sensitive adhesive of 76° C. and showing the slight change of 180° peel adhesive strength with times. Also, the line B in FIG. 6 is directed to the example having the glass transition temperature of the pressure sensitive adhesive of below 40° C. and showing the remarkable change of 180° peel adhesive strength with times.

(2) 180° Peel Adhesive Strength (i) Initial Value

Further, it is characteristic to set a value of the initial 180° peel adhesive strength ($F_{(C0)}$) of the surface protecting film to polycarbonate to 10 to 300 mN/25 mm.

The reason is that, when the initial 180° peel adhesive strength ($F_{(C0)}$) is below 10 mN/25 mm, it becomes difficult for the surface protecting film to laminate with polycarbonate and there arise the case where such surface protecting film spontaneously peels off from polycarbonate after laminating.

On the other hand, when the initial 180° peel adhesive strength ($F_{(C0)}$) is over 300 mN/25 mm, it becomes difficult to peel off the surface protecting film from polycarbonate.

Accordingly, it is preferable to set a value of the initial 180° peel adhesive strength ($F_{(C0)}$) of the surface protecting film to polycarbonate to 15 to 100 mN/25 mm and more preferable to set a value of 20 to 60 mN/25 mm.

(ii) Relational Equation (1)

Further, it is preferable that, assuming the initial 180° peel adhesive strength to polycarbonate as $F_{(C0)}$), and the 180° peel adhesive strength to polycarbonate after aging under the heating and pressing (at 70° C. and 20 g/cm² for 7 days) as $F_{(hp)}$, these $F_{(hp)}$ and $F_{(C0)}$ satisfy the following relational equation (1).

$$(F_{(hp)}-F_{(C0)})/F_{(C0)} \leqq 3.0 \tag{1}$$

The reason is that, by satisfying such relational equation (1) like this, it is easy for the surface protecting film to peel off from the polycarbonate, when the polycarbonate laminated with the surface protecting film is stored for a long period or in high temperature condition in the roll shape. Accordingly, since the 180° peel adhesive strength change on the any storing conditions becomes smaller, it becomes easy to control the storing condition as well as facilitating the automation apparatus in the peeling process.

Here, it is more preferable to set a value expressed by $(F_{(hp)}-F_{(C0)})/F_{(C0)}$ to 2.0 or less, and further more preferable to set a value of 0 to 1.0.

(iii) Relational Equation (2)

Further, it is preferable that $F_{(RL)}$ and $F_{(C0)}$ satisfy the following relational equation (2) in assuming that the surface protecting film is laminated with polycarbonate of the polycarbonate laminate comprising an adhesive layer provided on a releasing film and polycarbonate on the adhesive layer and the initial 180° peel adhesive strength between the polycarbonate laminate and the releasing film as $F_{(RL)}$.

$$F_{(RL)} > F_{(C0)} \tag{2}$$

Figure 5:
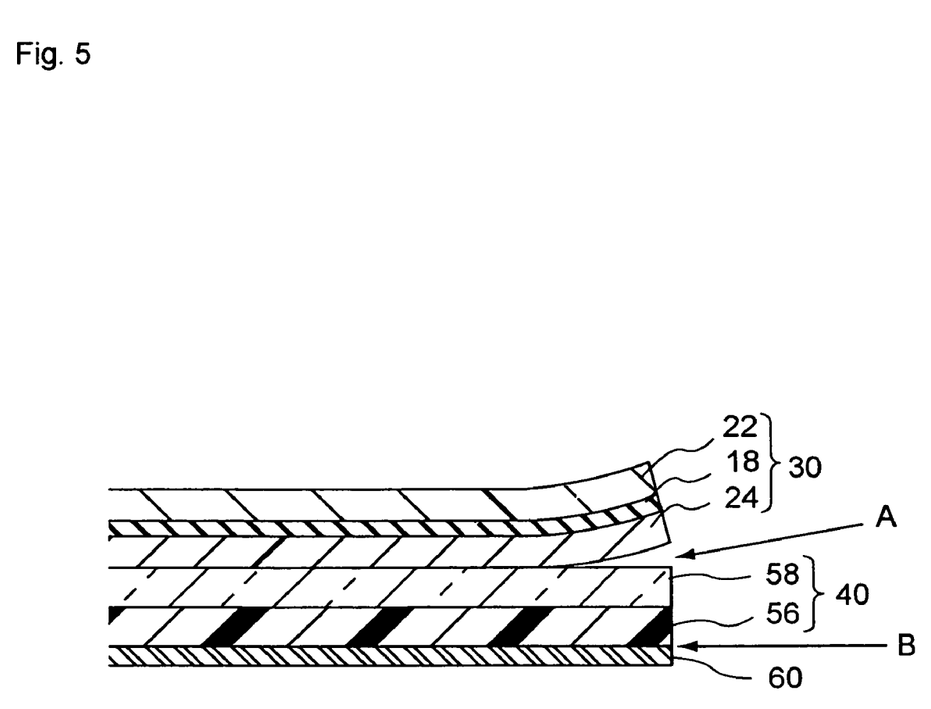
FIG. 5 is a view for explaining the relationship between the peel adhesive strength to polycarbonate and the peeling condition of the releasing film.

By adjusting the 180° peel adhesive strength like this, it is easy to set the 180° peel adhesive strength between the releasing film and the polycarbonate laminate to be higher than that between the surface protecting film and the polycarbonate laminate. For example, the 180° peel adhesive strength of the interface B between the releasing film 60 and the polycarbonate laminate 40 should be higher than that of the interface A between the surface protecting film 30 and the polycarbonate laminate 40 as shown in FIG. 5. The reason is that, by constituting like this, it is easy to prevent the releasing of the releasing film 60 and the polycarbonate laminate 40, when the surface protecting film 30 is peeled off from the polycarbonate laminate 40.

Accordingly, the releasing timing of the surface protecting film from the polycarbonate laminate becomes to be selective, in other words, the surface protecting film 30 may be released from the surface of the polycarbonate laminate 40 both of before and after laminating the polycarbonate laminate 40 with the objective substrate.

Here, more concretely, it is preferable to set the 180° peel adhesive strength between the releasing film and the polycarbonate laminate to a value within 3 to 200 mN/25 mm and more preferable to set it to a value within 5 to 100 mN/25 mm.

(iV) Relational Equation (3)

Also, with respect to the peel adhesive strength of the surface protecting film for polycarbonate, it is preferable that the initial 180° peel adhesive strength to polycarbonate ($F_{(C0)}$) and the initial 180° peel adhesive strength to releasing film of the polycarbonate laminate ($F_{(RL)}$) satisfy the following relational equation (3).

$$F_{(RL)} > 1.2 \times F_{(C0)} \quad (3)$$

The reason is that, by regulating the 180° peel adhesive strength between each film, it becomes easy to prevent the spontaneous peeling between the releasing film and the polycarbonate laminate, when the surface protecting film is peeled off from the polycarbonate laminate even in the environmental temperature change.

(3) Shear Storage Modulus

Further, it is preferable that the shear storage modulus (measured by a viscoelasticmeter) of the pressure sensitive adhesive at any temperature of 20 to 40° C. is set to a value within a range of $1 \times 10^7$ to $5 \times 10^{10}$ dyn/cm$^2$.

The reason is that, when the shear storage modulus is below $1 \times 10^7$ dyn/cm$^2$, there may be a case that, when the polycarbonate laminated with the surface protecting film is stored for a long period or in high temperature condition in the roll shape, it becomes difficult to peel off the surface protecting film from the polycarbonate.

On the other hand, when the shear storage modulus is over $5 \times 10^{10}$ dyn/cm$^2$, it may be difficult for the surface protecting film to laminate with the polycarbonate or the surface protecting film spontaneously separates from the polycarbonate after laminating.

Accordingly, it is more preferable that the shear storage modulus of the pressure sensitive adhesive at any temperature or every temperature of 20 to 40° C. is set to a value within a range of $1 \times 10^8$ to $1 \times 10^{10}$ dyn/cm$^2$, and further more preferable that the shear storage modulus of the pressure sensitive adhesive at any temperature of 20 to 40° C. is set to a value within a range of $5 \times 10^8$ to $1 \times 10^{10}$ dyn/cm$^2$.

Here, the line A in FIG. 6 is directed to the example having the shear storage modulus of the pressure sensitive adhesive of $1.2 \times 10^{10}$ dyn/cm$^2$ and showing the slight change of 180° peel adhesive strength with times. Also, the line B in FIG. 6 is directed to the commercially available surface protecting film, Sunnytect PAC-3 (manufactured by SUN A KAKEN CO., LTD.) having the comparative low shear storage modulus and showing the remarkable change of 180° peel adhesive strength with times.

(4) Type

As for the type of pressure sensitive adhesive, it is not limited, but for example, the three-dimensional cross-linked material (type 1) containing of the curable material comprising the component (A): (meth)acrylate copolymer and the component (B): at least one curable agent selected from an energy ray curable agent and a thermosetting agent is preferable, or the three-dimensional cross-linked material (type 2) containing of the (meth)acrylate copolymer comprising 15 wt. % or more of the (meth)acrylate ester monomer having the functional group is preferable. Hereinafter, such pressure sensitive adhesive directed to type 1 and 2 will be concretely explained.

(i) Type 1

The pressure sensitive adhesive directed to type 1, namely the three-dimensional cross-linked material (type 1) containing of the curable material comprising the component (A) (meth)acrylate acid ester copolymer and the component (B) curable agent will be concretely explained. Such pressure sensitive adhesive is the three-dimensional cross-linked material, which may be obtained by irradiation of an energy ray such as an UV ray or an electron beam to the curable material, or by heating the material.

Firstly, the (meth)acrylate copolymer as the component (A), is the polymer made from (meth)acrylate monomer or its derivative as a main component and other monomers optionally may be included as a co-component. Such preferred (meth)acrylate monomer are methyl (meth)acrylate, ethyl(meth)acrylate, n-butyl (meth)acrylate, isobutyl (meth)acrylate, pentyl (meth)acrylate, hexyl (meth)acrylate, 2-ethylhexyl (meth)acrylate, n-octyl (meth)acrylate, iso-octyl (meth)acrylate, and like are illustrated in a single use or a combination use of the two monomers.

Further, as the other monomer of a co-component, which is included in the component (A) is, for example, a monomer having the functional group such as (meth)acrylate, crotoic acid, maleic acid, 2-hydroxyethyl (meth)acrylate, 3-hydroxybutyl (meth)acrylate, (meth)acrylamide, N-methyloacrylamide, and (meth)acrylonitrile, vinyl acetate, styrene and the like.

Further, as (A) (meth)acrylate copolymer, which is included in the component (A), it is preferable to use a (meth)acrylate copolymer having the unsaturated group in the side chain of the copolymer. The reason is that the low molecular weight component comprised in the component (A) may be polymerized to be a polymer or the component (A) may react with the component (B) when the component (B) is cured. Accordingly, it becomes easy to control the peel adhesive strength of the obtained pressure sensitive adhesive.

Here, the foregoing copolymer can be made by adding the compound having both of the unsaturated group and the reactive group with the functional group included in a (meth)acrylate copolymer to the (meth)acrylate copolymer having the functional group.

The unsaturated group is exemplified as a (meth)acryloyl group and the like, and the reactive group is exemplified as an isocyanate group, a glycidyl group and the like. Accordingly, as for the compounds like this, methacryloyl oxyethyl isocyanate, methacryloyl isocyanate, allyl isocyanate, glycidyl (meth)acrylate and the like are named. Thus, the reactive group such as an isocyanate group and a glycidyl group can react with the functional group such as a carboxyl group and a hydroxyl group in the (meth)acrylate copolymer having no unsaturated group in the side chain to produce the (meth)acrylate copolymer having the unsaturated group in the side chain.

Further, it is preferable to set the content of monomer having the functional group constituting the (meth)acrylate copolymer before introducing the unsaturated group in the side chain to the value within a range of 3 to 50 wt. %. Moreover, when introducing the unsaturated group, it is preferable to set the additional ratio of the reactive group to a value within a range of 10 to 80 mol % assuming the amount of the functional group of the (meth)acrylate copolymer is 100 mol %.

Further, it is more preferable that the numeric average molecular weight (Mn) of the copolymer is set to a value within a range of $2\times10^5$ to $2\times10^6$.

The reason is that, when such Mn of the copolymer is below $2\times10^5$, there may be a case that the cohesive strength of the copolymer may be insufficient and the 180° peel adhesive strength may increase to the film substrate and polycarbonate. On the other hand, when such Mn of the copolymer is over $2\times10^6$, it may be difficult to form the adhesive layer on the film substrate.

Accordingly, it is more preferable that the numeric average molecular weight (Mn) of the copolymer is set to a value within a range of $3\times10^5$ to $12\times10^5$, and further more preferably that the numeric average molecular weight (Mn) of the copolymer is set to a value within a range of $4\times10^5$ to $8\times10^5$.

Here, the numeric average molecular weight (Mn) of the copolymer can be measured by gel permeation chromatography (GPC) using the calibration curve of the standard polystyrene particles.

On the other hand, as the curable component (B), it is preferable to use the oligomer having the molecular weight of 10,000 or less or the monomer which has the unsaturated group in a molecular and may be cured by irradiation of an energy ray or using a heating process. More concretely, trimethylolpropane triacrylate, pentaerythritol triacrylate, pentaerythritol tetraacrylate, dipentaerythritol hexaacrylate, 1,4-butyleneglycol diacrylate, 1,6-hexandiol diacrylate, polyurethane acrylate, polyester acrylate, polyether acrylate, epoxy acrylate and the like are illustrated.

Further, it is more preferable that the containing quantity of (meta)acrylate copolymer as (A) component is set to a value of 30 wt. % or more based on the total weight of (A) component and (B) component. In other words, it is more preferable that the containing quantity of the curable component (B) is set to a value of 70 wt. % or less.

The reason is that when such containing quantity of component (A) is below 30 wt. %, there may be a case that the 180° peel adhesive strength of the copolymer may dramatically decrease to the film substrate and polycarbonate.

On the other hand, when the containing quantity of (meth)acrylate copolymer which has no unsaturated group in the side chain as component (A) is over 85 wt. %, it may be difficult to peel off the surface protective film from polycarbonate since the initial peel adhesive strength of the surface protective film to the polycarbonate excessively becomes higher and the peel adhesive strength after heating process becomes much higher.

Accordingly, it is more preferable that the containing quantity of component (A) is set to a value within a range of 30 to 90 wt. %, and further more preferable that the containing quantity of (A) component is set to a value within a range of 50 to 80 wt. %.

Next, the effect of the containing quantity of (B) component on the shear storage modulus change of the copolymer with temperature change will be explained with referring to FIG. 3.

Figure 3:
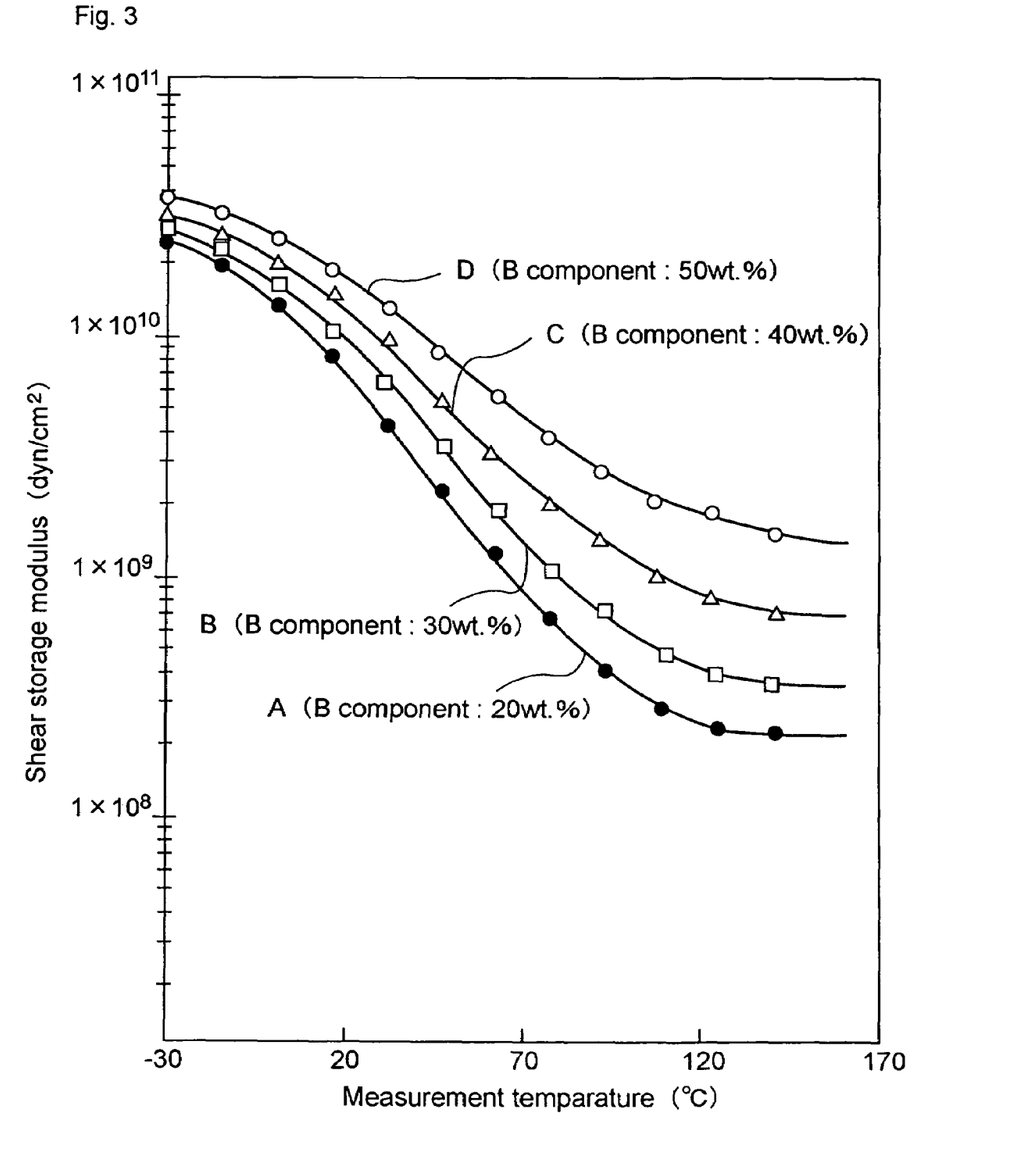
FIG. 3 is a view for explaining the effect of the containing quantity of (B) component on the shear storage modulus with temperature change.

In FIG. 3, the measuring temperature (° C.) is taken on an axis of abscissas and the logarithm of the shear storage modulus (dyn/cm$^2$) is taken on a left axis of ordinates, wherein a curved line A indicates the shear storage modulus of the pressure sensitive adhesive comprising the component (B) of 20 wt. %, a curved line B indicates the shear storage modulus of the pressure sensitive adhesive comprising the component (B) of 30 wt. %, and a curve C indicates the shear storage modulus of the pressure sensitive adhesive comprising (B) component of 40 wt. % and a curved line D indicates the shear storage modulus of the pressure sensitive adhesive comprising the component (B) of 50 wt. %.

From these viscoelastic profiles of shear storage modulus, it can be understood, that the lower the containing quantity of the component (B) is, the bigger the shear storage modulus change with temperature becomes, namely such value becomes dramatically low at a high temperature. On the contrary, the more the containing quantity of the component (B) is, the lower the shear storage modulus change with temperature becomes, namely the higher value is maintained at a high temperature.

Accordingly, it can be said that the change of the containing quantity of the component (B) is effective to adjust the shear storage modulus of the copolymer.

Further, it is preferable to add the polymerization initiator into the curable composition. Such polymerization initiator is typically a radical initiator and is illustrated as acetophenone type initiators such as 4-(2-hydroxyetoxy)phenyl(2-hydroxy-2-propyl)ketone, 1-hydroxy cyclohexylphenylketone, 2-hydroxy-2,2-dimetylacetophenone, methoxy acetophenone, 2,2-dimetoxy-2-phenylacetophenone; ketal type initiators such as benzyldimethyl ketal; halogenated keton, acyl phosphynoxide, acyl phosphonate, benzoin, benzoil peroxide, dicumyl peroxide and the like in a single use or a combination use of these initiators.

Further, it is preferable that the containing quantity of the polymerization initiator is set to a value within a range of 0.1 to 10 pbw. (parts by weight) based on 100 pbw. of the curable composition.

The reason is that the curing speed of the curable composition may dramatically decrease if such containing quantity is below 0.1 pbw. On the other hand, the curable composition may be unstable in storing or the mechanical property of the obtainable cured material may decrease if such containing quantity is over 10 pbw.

Accordingly, it is more preferable that the containing quantity of the polymerization initiator is set to a value within a range of 1 to 8 pbw. based on 100 pbw. of the curable composition and more further preferable that it is set to a value within a range of 2 to 6 pbw.

(ii) Type 2

It is preferable to use the three-dimensional cross-linked material of the (meth)acrylate copolymer obtained by using 15 wt. % or more of the monomer having the functional group as the pressure sensitive adhesive. Thus, the three-dimensional cross-linked material of the (meth)acrylate copolymer obtained by using 15 wt. % or more of the monomer having the functional group is firstly obtained by using a 15 wt. % or more of the monomer having the functional group based on the total monomer (100 wt. %) constituting the copolymer, and then is reacted with the cross-linking agent to be three-dimensional cross-linked material.

Here, the reason is that it may become difficult to peel off the surface protecting film easily since the initial peel adhesive strength and that after aging under the heating and pressing may increase, if the content of the monomer having a functional group is below 15 wt. %. However, the content of the monomer having a functional group is over 30 wt. %, the peel adhesive strength to the polycarbonate may dramatically decrease.

Accordingly, the three-dimensional cross-linked material of (meta)acrylate copolymer comprising 20 to 30 wt. % of the monomer having a functional group is more preferable.

Here, such cross-linking agents are illustrated as a polyisocyanate compound, an epoxy compound, an aziridine compound, a metal chelate compound and the like which are already known in this technical field.

Further, it is preferable to set the containing quantity of such cross-linking agent to a value of 0.1 times as the functional group of the (meth)acrylate copolymer in stoichiometry and more preferable to set the value within a range of 0.5 to 1.5 times.

The reason is that the residual cross-linking agent which dose not attribute to the curing reaction, may increase, and it is the origin of the contamination of the polycarbonate, if such containing quantity is over 1.5 times.

(5) Thickness

Further, it is preferable to set a thickness of the adhesive layer to a value within a range of about 1 to 20 μm.

The reason is that when the thickness of the adhesive layer is below 1 μm, there may be a case that the lamination of the surface protecting film with the polycarbonate film becomes difficult and such surface protecting film spontaneously peels off from the polycarbonate film after laminating.

On the other hand, when the thickness of the adhesive layer exceeds 20 μm, the peel adhesive strength is not changed, which is not practical problem but is not economical constitution.

Accordingly, it is more preferable to set the thickness of the adhesive layer to a value within a range of about 3 to 15 μm and to a value within a range of about 5 to 10 μm.

(6) Transparency

Further, it is preferable that the adhesive is transparent. The reason is that the photo curable composition which adhere the polycarbonate substrate and the polycarbonate film of the next generation DVD as shown in FIG. 4 can be effectively cured through the film substrate and the adhesive, if such film substrate and the adhesive are transparent.

(7) Producing Method

Further, it is preferable that the present surface protecting film may be produced in the following steps of (7)-1 and (7)-2, for example.

(7)-1 Preparation of Film Substrate

As the above mentioned, even if the Young's modulus is 1 GPa or more, the type of the film substrate is not limited, but polyethylene terephthalate film is preferable, for example.

When the surface protecting film may be produced in the roll shape, it is preferable to prepare the tape type film substrate having the length of 5 m or more, and more preferably having the length of 100 to 2000 m.

(7)-2 Forming Step of Adhesive Layer (i) Coating Step

As for the coating method of the adhesive layer, it is not limited, but a knife type coating machine, a roll type coating machine, a gravure type coating machine, an applicator type coating machine, a spinning coating machine and the like may be preferably used.

(ii) Curable Step

When the adhesive is constituted by the curable composition, the photo curable adhesive composition is cured by irradiation of an UV ray, Electron beam and the like to produce the pressure sensitive adhesive from the curable composition. For example, in case of irradiation of an UV ray, its dosage of an UV ray is preferable to be the value within a range of 30 to 500 mJ/cm$^2$

EXAMPLE

Although the present inventions are explained in detail hereinafter based on examples, it is needless to say that the present inventions are not limited by the description of these examples.

Example 1

1. Producing Method for Surface Protecting Film for Polycarbonate (1) Preparation of the Pressure Sensitive Adhesive An acrylate copolymer (monomer formulation: n-butyl acrylate/acrylic acid=80:20 by weight, numeric average molecular weight (Mn) based on polystyrene standards: about 500,000) having an unsaturated group in the side chain of the copolymer in toluene solution made from the reaction of 0.3 mol of 2-methacryloyloxy ethyl isocyanate having an isocyanate group at one end and an acryloyl group at the other end with 1.0 mol of a carboxyl group of acrylic acid of the acrylate copolymer (additional ratio:30%), and polyurethane acrylate (manufactured by Dainichiseika kogyo KK, seikabeam PU-4) were mixed in the solid weight ratio of 3:1 as curing components to produce a mixture.

Then, 5 pbw. of Irgacure 184 (manufactured by Chiba specialty chemical Co.) as a photo polymerization initiator of hydroxyphenylketone type was added to 100 pbw. of the obtained mixture(solid base) and stirred sufficiently to produce the photo curable composition.

(2) Forming Step of the Adhesive Layer

The obtained photo curable composition was coated on the 25 μm of polyethylene terephthalate film treated with adhesion improvement (manufactured by TOYOBO Co. Ltd., polyester film A4100-25#, Young's modulus:4 GPa) by using a knife coater and dried for 1 min. at 100° C. to obtain the photo curable composition sheet having the thickness of 5 μm after drying.

On the obtained photo curable composition sheet, the 25 μm of polyethylene terephthalate film coated with a silicone resin as a releasing film was laminated in facing the photo curable composition of the obtained sheet. Then, an UV ray was irradiated to the photo curable composition via the releasing film by using an UV irradiation machine (manufactured by Fusion UV System Co, CV-110Q-G) to obtain the three-dimensional cross-linked material as an adhesive layer. Consequently, the surface protecting film for polycarbonate was obtained.

2. Evaluation for Surface Protecting Film

(1) Viscoelatic Measurement

By using a viscoelaticmeter (manufactured by TOYO Baldwin Co. Ltd., Rheovibron DDV-II-EP), tan δ, shear storage modulus (E') and complex modulus (E") of the adhesive of the obtained surface protecting film were measured in dynamic scanning method in the condition the temperature elevating speed of 3° C./min. and a frequency of 11 Hz. Calculated grass transition temperature from tan δ peak position and measured shear storage modulus (E') at 20° C. and 40° C. were shown in table 1.

(2) 180° Peel Adhesive Strength Measurement

After taking away the releasing film from the obtained surface protecting film, the surface protecting film and the polycarbonate of the polycarbonate laminate comprising the adhesive layer provided on the other releasing film were laminated to produce the measurement samples of the surface protecting film.

Then, the 180° peel adhesive strength of the surface protecting film to the polycarbonate of the measurement sample after allowing to stand for 7 days at 25° C. (normal condition) and that of the measurement sample after aging under the heating and pressing (at 70° C. and 20 g/cm$^2$ for 7 days) were measured in accordance with JIS Z 0237.

As a result of this, the 180° peel adhesive strength ($F_{(CO)}$) of the measurement sample after allowing to stand for normal condition was 20 mN/25 mm and the 180° peel adhesive strength ($F_{(hp)}$) after aging under the heating and pressing was 25 mN/25 mm. Also, the peel adhesive strength ($F_{(RL)}$) of the releasing film to polycarbonate laminate after allowing to stand for normal condition was 50 mN/25 mm. From these results, it is confirmed that the surface protecting film of example 1 can satisfy both of the relational equations (1) and (2) at the same time.

(3) Winding Compaction Test

Two rolls having the length of 500 m and the width of 300 mm of the surface protecting film directed to example 1 were made as the measurement samples and each of them was stored in the two temperature conditions (three months at normal condition, three months at 40° C.) and then winding compaction test was carried out and evaluated in the following criteria. The obtained results were shown in table 1.
Very good: No wrinkle observance in the roll shape
Good: Little wrinkle observance in the roll shape
Fair: Slightly wrinkle observance in the roll shape
Bad: Remarkable wrinkle observance in the roll shape

(4) Adhesive Transfer Test

After cutting the measurement sample which was evaluated after aging under the heating and pressing (at 70° C. and 20 g/cm$^2$ for 7 days) into A4 size, the surface protecting film was released. Then, the polycarbonate surface (Area: about 900 um$^2$) of the polycarbonate laminate was observed by using a scanning laser microscope 1LM21 (manufactured by LASERTECH Co. Ltd) and the transfer of the pressure sensitive adhesive was evaluated in accordance with the following criteria.

Figure 7:
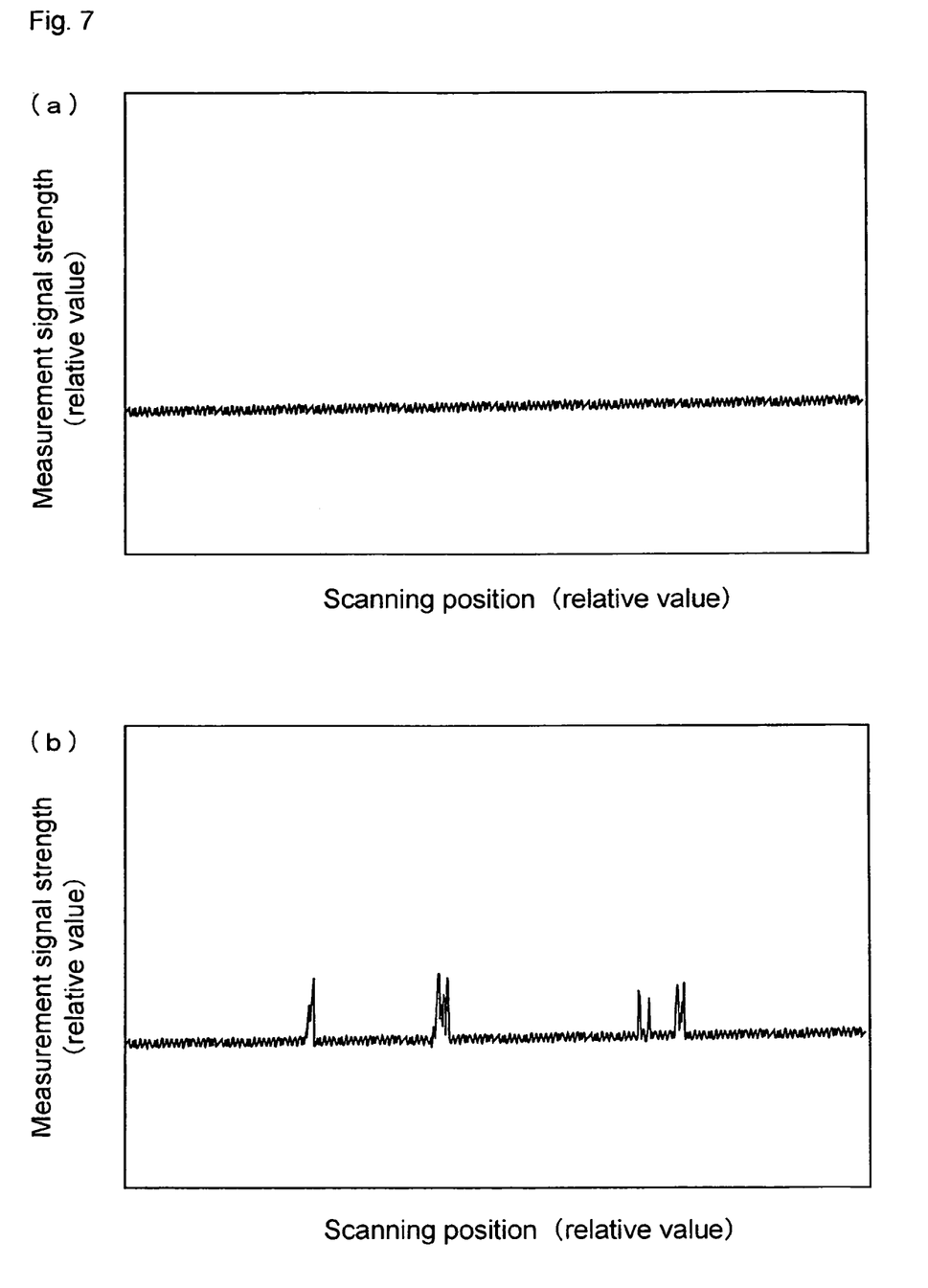
Figure 8:
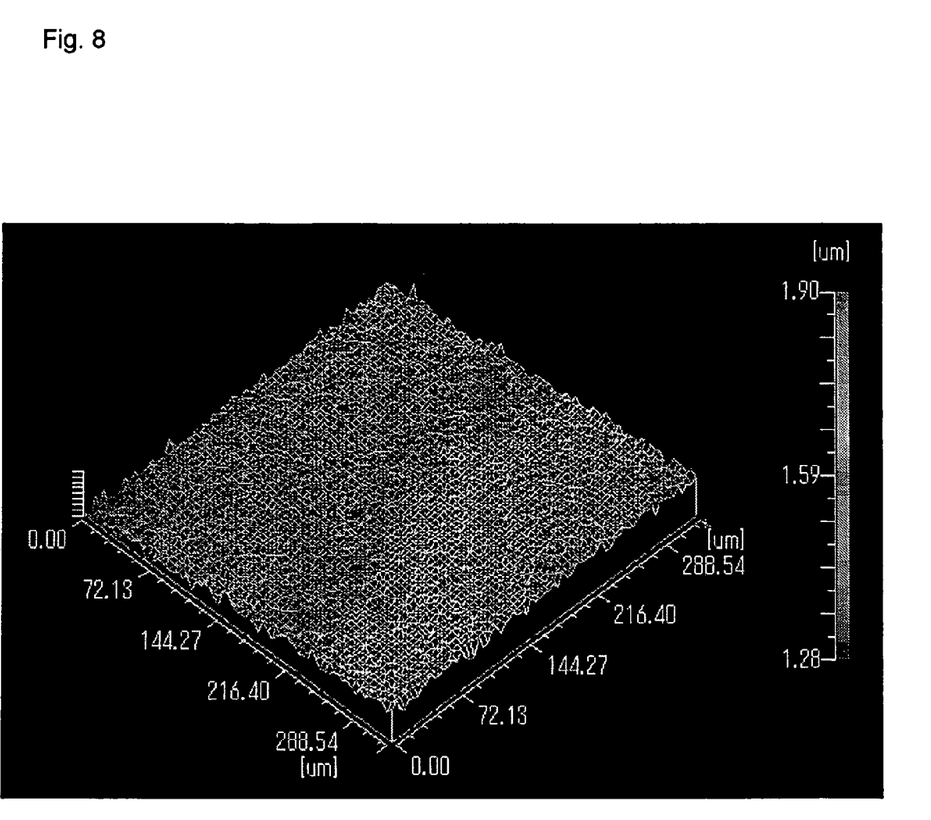
FIG. 8 is a three-dimensional view of polycarbonate surface obtained from a laser microscope.

Here, FIG. 7(a) is directed to an example showing no signal by a laser microscope (corresponding to example 1) and FIG. 8 shows a three-dimensional view of polycarbonate surface obtained from a laser microscope. Also, FIG. 7(b) is directed to an example showing the remarkable signal by a laser microscope (corresponding to comparative example 1) in comparison with FIG. 7(a).
Very good: No measurement signal by a laser microscope
Good: Little measurement signal by a laser microscope
Fair: Slightly measurement signal by a laser microscope
Bad: Remarkable measurement signal by a laser microscope

Example 2

1. Producing for Surface Protecting Film for Polycarbonate

(1) Preparation of the Pressure Sensitive Adhesive 100 pbw. (solid base) of an acrylate copolymer in toluene solution (monomer formulation: 2-ethylhexyl acrylate:2-hydroxyethyl acrylate=72:28 by weight, Numeric average molecular weight in accordance with polystyrene standard (Mn): about 800,000) and 12.5 pbw. of polyisocyanate (cross-linking agent, Colonate L manufactured by NIPPON POLYURETHANE INDUSTRY CO.,LTD) were mixed uniformly by stirring to produce the pressure sensitive adhesive composition.

The obtained pressure sensitive adhesive composition was coated on the 25 μm of polyethylene terephthalate film treated with an adhesive improvement by using a gravure coater. Then, the pressure sensitive adhesive composition was dried for 3 min. at 120° C. to form the tree-dimensional cross-linking structure while the pressure sensitive adhesive composition having the thickness of 3 μm after drying. Then, the polypropylene film having the thickness of 30 μm was laminated onto the pressure sensitive adhesive to produce the surface protecting film. Moreover, the measurement samples were made from the obtained surface protecting film in the same manners of example 1.

2. Evaluation for Surface Protecting Film

(1) Viscoelatic Measurement

Tan δ, shear storage modulus (E') and complex modulus (E") of the measurement samples were measured in the same manners of example 1.

(2) 180° Peel Adhesive Strength Measurement

The 180° peel adhesive strength of the measurement samples for normal condition and after aging under the heating and pressing were measured in the same manners of example 1.

As a result of this, the 180° peel adhesive strength ($F_{(CO)}$) of the measurement sample after allowing to stand for normal condition was 30 mN/25 mm and the 180° peel adhesive strength ($F_{(hp)}$) after aging under the heating and pressing was 65 mN/25 mm. Also, the peel adhesive strength ($F_{(RL)}$) of the releasing film to polycarbonate laminate after allowing to stand for normal condition was 50 mN/25 mm. From these results, it is confirmed that the surface protecting film of example 2 can satisfy both of the relational equations (1) and (2) at the same time.

In addition, the 180° peel adhesive strength of the releasing film to polycarbonate laminate after aging under the heating and pressing was 80 mN/25 mm.

(3) Winding Compaction Test

The winding compaction test of the example 2 was carried out in the same manners of example 1.

(4) Adhesive Transfer Test

The adhesive transfer test of the example 2 was carried out in the same manners of example 1.

Examples 3 and 4

1. Producing for Surface Protecting Film for Polycarbonate

In example 3, except for using the non-expanded polypropylene film having the thickness of 25 μm and applied for corona treatment on the one face (manufactured by Futamura Chemical Industries Co. Ltd., Taikou FC-FP 25#, Young's modulus: 1.1 GPa) for the polyethylene terephthalate film of example 1, the same procedure as of example 1 was carried out to produce the measurement sample of example 3.

In example 4, except for not adding polyurethane acrylate as the curable component into the pressure sensitive adhesive of example 1, the same procedure as of example 1 was carried out to produce the measurement sample of example 4.

2. Evaluation for Surface Protecting Film (1) Viscoelatic Measurement

Tan δ, shear storage modulus (E') and complex modulus (E") of the pressure sensitive adhesive of the surface protecting film for polycarbonate of example 3 and 4 were measured in the same manners of example 1.

(2) 180° Peel Adhesive Strength Measurement

The 180° peel adhesive strength of the measurement samples of examples 3 and 4 for normal condition and after aging under the heating and pressing were measured in the same manners of example 1.

As a result of this, the 180° peel adhesive strength ($F_{(CO)}$) of the measurement sample of example 3 after allowing to stand for normal condition was 20 mN/25 mm and the 180° peel adhesive strength ($F_{(hp)}$) after aging under the heating and pressing was 25 mN/25 mm. The 180° peel adhesive strength ($F_{(CO)}$) of the measurement sample of example 4 after allowing to stand for normal condition was 22 mN/25 mm and the 180° peel adhesive strength ($F_{(hp)}$) after aging under the heating and pressing was 80 mN/25 mm.

Also, the peel adhesive strength ($F_{(RL)}$) of the releasing film to polycarbonate laminate of example 3 after allowing to stand for normal condition was 50 mN/25 mm and that of example 4 was 50 mN/25 mm. From these results, it is confirmed that the surface protecting film of examples 3 and 4 can satisfy both of the relational equations (1) and (2) at the same time.

(3) Winding Compaction Test

The winding compaction tests of the example 3 and example 4 were carried out in the same manners of example 1.

(4) Adhesive Transfer Test

The adhesive transfer tests of the example 3 and example 4 were carried out in the same manners of example 1.

Example 5

1. Producing for Surface Protecting Film for Polycarbonate (1) Preparation of the Pressure Sensitive Adhesive An acrylate copolymer in ethyl acetate solution having an unsaturated group in the side chain (monomer formulations: 2-ethylhexyl acrylate:2-hydroxyethyl acrylate=80:20 by weight, Numeric average molecular weight in accordance with polystyrene standard (Mn): about 700,000) was obtained by reacting 0.8 mol of 2-methacryloyloxyetyl isocyanate having an isocyanate group at one end and an acryloyl group at the other end with 1 mol of a hydroxy group of 2-hydroxyethyl acrylate of the acrylate copolymer (additional ratio: 80%).

Then, 5 pbw. of Irgacure 184 ( manufactured by Ciba specialty chemicals Co.) which was a photo polymerization initiator of hydroxyphenylketon was mixed to 100 pbw. (solid base) of the obtained polymer solution and stirred uniformly to produce the photo curable composition.

(2) Forming Step of the Adhesive Layer

Except for using the 38 μm of polyethylene terephthalate film (SP-PET 38C manufactured by LINTEC corporation) for the releasing film, the same procedure of example 1 was carried out by using the obtained photo curable composition to produce the surface protecting film for polycarbonate. The measurement samples of example 5 were made from the obtained surface protecting film in the same manners of example 1.

2. Evaluation for Surface Protecting Film for Polycarbonate (1) Viscoelatic Measurement Tan δ, shear storage modulus (E') and complex modulus (E") of the pressure sensitive adhesive of the surface protecting film for polycarbonate of example 5 were measured in the same manners of example 1.

(2) 180° Peel Adhesive Strength Measurement

The 180° peel adhesive strength of the measurement samples of examples 5 for normal condition and after aging under the heating and pressing was measured in the same manners of example 1.

As a result of this, the 180° peel adhesive strength ($F_{(CO)}$) of the measurement sample of example 5 after allowing to stand for normal condition was 105 mN/25 mm and that after aging under the heating and pressing was 360 mN/25 mm. Also, the peel adhesive strength ($F_{(RL)}$) of the releasing film to polycarbonate laminate of example 5 after allowing to stand for normal condition was 280 mN/25 mm. From these results, it is confirmed that the surface protecting film of example 5 can satisfy both of the relational equations (1) and (2) at the same time.

(3) Winding Compaction Test

The winding compaction test of the example 5 was carried out in the same manners of example 1.

(4) Adhesive Transfer Test

The adhesive transfer test of the example 5 was carried out in the same manners of example 1.

Comparative Example 1

The surface protecting film polyolefin type base material (Young's modulus:0.3 GPa) coated with ethylene-acetic vinyl type pressure sensitive adhesive and having the thickness of about 70 μm (manufactured by SUN A KAKEN CO., LTD. sunnytect PAC-3) was laminated with the polycarbonate laminate to produce the measurement sample. Then, the 180° peel adhesive strength measurement test, the winding compaction test and the adhesive transfer test were carried out in the same manners of example 1. The obtained results were shown in table 1.

As a result of this, the 180° peel adhesive strength ($F_{(CO)}$) of the measurement sample after allowing to stand for normal condition was 70 mN/25 mm and the 180° peel adhesive strength ($F_{(hp)}$) after aging under the heating and pressing was 1300 mN/25 mm. Thus, it is confirmed that the surface protecting film of comparative example 1 cannot satisfy each of the relational equations (1) and (2).

TABLE 1

|  | Example 1 | Example 2 | Example 3 | Example 4 | Example 5 | Comp-Example 1 |
|---|---|---|---|---|---|---|
| Young's modulus of film substrate (GPa) | 4 | 4 | 1.1 | 4 | 4 | 0.3 |
| Tg of Adhesive (° C.) | 76 | 76 | 76 | 45 | 40 | <40 |
| E' of Adhesive |  |  |  |  |  |  |
| 20° C. (dyn/cm$^2$) | $1.2 \times 10^{10}$ | $8.2 \times 10^{9}$ | $1.2 \times 10^{10}$ | $2.6 \times 10^{9}$ | $1.4 \times 10^{9}$ | — |
| 40° C. (dyn/cm$^2$) | $6.0 \times 10^{9}$ | $1.4 \times 10^{9}$ | $6.0 \times 10^{9}$ | $6.9 \times 10^{8}$ | $5.6 \times 10^{8}$ | — |
| Peel adhesive strength $F_{(CO)}$ (mN/25 mm) | 20 | 30 | 20 | 22 | 105 | 70 |
| Peel adhesive strength $F_{(hp)}$ (mN/25 mm) | 25 | 65 | 25 | 80 | 360 | 1300 |
| Peel adhesive strength $F_{(RL)}$ (mN/25 mm) | 50 | 50 | 50 | 50 | 280 | 50 |
| Winding compaction test |  |  |  |  |  |  |
| 20° C. | Very good | Very good | Very good | Very good | Good | Bad |
| 40° C. | Very good | Good | Very good | Fair | Fair | Bad |
| Adhesive transfer test at 70° C. | Very good | Very good | Very good | Very good | Good | Bad |

INDUSTRIAL APPLICABILITY

According to the present surface protecting film for polycarbonate comprising the substrate having the specific Young's modulus and the adhesive layer having the specific grass transition temperature and the 180° peel adhesive strength, it becomes easy to stick to and to peel off from polycarbonate film (polycarbonate laminate) and to provide a surface protecting film having the small increasing adhesive strength change with times in storing for a long period or at a high temperature in the roll shape made of a long length tape.

Further, according to the present surface protecting film for polycarbonate, since the peel adhesive strength of the surface protecting film to the polycarbonate laminate having the adhesive layer is lower than that of the polycarbonate laminate to the releasing film by controlling the 180° peel adhesive strength of the protecting film to the polycarbonate laminate, it becomes easy to peel off the surface protecting film from the polycarbonate laminate having the adhesive layer before the polycarbonate laminate is stuck to the other substrate.

What is claimed is:

1. A surface protecting film for polycarbonate, wherein a film substrate having Young's modulus of 1 GPa or more and a pressure sensitive adhesive layer are comprised, the glass transition temperature (Tg) of the pressure sensitive adhesive composing of the adhesive layer being between 40 to 90° C. and the initial 180° peel adhesive strength ($F_{(co)}$) to polycarbonate being between 10 to 300 mN/25 mm, and the shear storage modulus of the pressure sensitive adhesive at any temperature of 20 to 40° C. being set to a value within a range of $5 \times 10^8$ to $5 \times 10^{10}$ dyn/cm$^2$, wherein the pressure sensitive adhesive comprises a three-dimensional cross-linked material comprising component (A) and component (B), wherein:

component (A) comprises 30 to 80 wt % (meth)acrylate copolymer, and component (B) comprises 20-70 wt % based on the total weight of components (A) and (B), of at least one curable agent selected from an energy ray curable agent and a thermosetting agent.

2. The surface protecting film for polycarbonate according to claim 1, wherein assuming a 180° peel adhesive strength to polycarbonate after aging under the heating and pressing (at 70° C. and 20 g/cm$^2$ for 7 days) as F(hp), and F(hp) and F(co) satisfy the following relational equation (1).

$$(F_{(hp)} - F_{(co)})/F_{(co)} \leq 3.0 \qquad (1)$$

3. The surface protecting film for polycarbonate according to claim 1, wherein the said component (B) is a photo curable polyurethane acrylate.

4. The surface protecting film for polycarbonate according to claim 1, wherein the said pressure sensitive adhesive is made of the three-dimensional cross-linked material of (meth)acrylate copolymer obtained by using a 15 wt, % or more of monomer having a function group.

5. The surface protecting film for polycarbonate according to claim 1, wherein an adhesion improvement layer is provided between the film substrate and the said adhesive layer.

6. The surface protecting film for polycarbonate according to claim 1, wherein $F_{(RL)}$ and $F_{(CO)}$ satisfy the following relational equation (2) in assuming that the surface protecting film is laminated with polycarbonate of the polycarbonate laminate comprising an adhesive layer provided on a releasing film and polycarbonate on the adhesive layer and the 180° peel adhesive strength between the releasing film and the polycarbonate laminate as $F_{(RL)}$.

$$F_{(RL)} > F_{(co)} \qquad (2)$$

7. The surface protecting film for polycarbonate according to claim 1, wherein the surface protecting film for polycarbonate is used for a Blu-ray Disc and a DVD made of the polycarbonate.

* * * * *